United States Patent
Benirschke (12)

(10) Patent No.: US 6,688,621 B2
(45) Date of Patent: Feb. 10, 2004

(54) ARRANGEMENT FOR FASTENING AN EXTERNALLY MOUNTED ELEMENT TO A BODY STRUCTURE OF A MOTOR VEHICLE AND METHOD OF MAKING SAME

(75) Inventor: Oliver Benirschke, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/127,656

(22) Filed: Apr. 23, 2002

(65) Prior Publication Data

US 2002/0158439 A1 Oct. 31, 2002

(30) Foreign Application Priority Data

Apr. 26, 2001 (DE) .......................... 101 20 444

(51) Int. Cl.⁷ .................................. B60R 3/00
(52) U.S. Cl. ......................... 280/163; 280/166; 280/169
(58) Field of Search ............................ 280/163, 164.1, 280/169, 770, 164.2, 165, 166; 296/75; 403/279, 282, 326

(56) References Cited

U.S. PATENT DOCUMENTS

| | | | | |
|---|---|---|---|---|
| 2,208,723 A | * | 7/1940 | Doty | 296/199 |
| 4,355,842 A | * | 10/1982 | Hira | 296/199 |
| 4,451,063 A | * | 5/1984 | Snyder | 280/163 |
| 4,456,275 A | * | 6/1984 | Snyder et al. | 280/163 |
| 5,062,665 A | * | 11/1991 | Schotthoefer | 280/770 |
| 5,139,306 A | * | 8/1992 | Ott et al. | 296/198 |
| 5,193,829 A | | 3/1993 | Holloway et al. | |
| 5,382,035 A | | 1/1995 | Waddington et al. | |
| 5,713,589 A | * | 2/1998 | Delgado et al. | 283/163 |
| 5,788,321 A | * | 8/1998 | McHorse et al. | 296/180.1 |
| 5,823,553 A | * | 10/1998 | Thompson | 280/164.1 |
| 5,895,064 A | * | 4/1999 | Laubach | 280/163 |
| 6,050,579 A | * | 4/2000 | Selland et al. | 280/163 |
| 6,173,979 B1 | | 1/2001 | Bernard | |

FOREIGN PATENT DOCUMENTS

| | | |
|---|---|---|
| DE | 299 00 510 | 9/1999 |
| DE | 29900510 | 9/1999 |

* cited by examiner

Primary Examiner—Brian L. Johnson
Assistant Examiner—Brian L. Swenson
(74) Attorney, Agent, or Firm—Crowell & Moring LLP

(57) ABSTRACT

An arrangement, optionally a running board or a side member covering can be mounted on a strip-type support profile connected with the vehicle body. The connection between the support profile and the running board or the side member covering takes place by mutually corresponding concave and convex longitudinal profile edges on the running board and on the support profile or on the side member covering. In a simple manner the running board with the support profile or the side member covering with the support profile may be optionally connected.

34 Claims, 8 Drawing Sheets

ARRANGEMENT FOR FASTENING AN EXTERNALLY MOUNTED ELEMENT TO A BODY STRUCTURE OF A MOTOR VEHICLE AND METHOD OF MAKING SAME

BACKGROUND AND SUMMARY OF THE INVENTION

This application claims the priority of German Patent Document DE 101 20 444.2, filed on Apr. 26, 2001, the disclosure of which is expressly incorporated by reference herein.

The invention relates to an arrangement for fastening an externally mounted element, particularly a running board or a side member covering, to a body structure of a motor vehicle by way of fastening elements, the body element extending along a side of the vehicle body.

From U.S. Pat. No. 5,193,829, a running board is known which can be externally mounted on a motor vehicle and which can, be connected with the vehicle body by means of fastening elements.

It is an aspect of the invention to provide an improved arrangement for the fastening of externally mounted elements, such as a running board or a side member covering, to a body structure of a motor vehicle, which arrangement can be easily mounted and exchanged, ensures a stable fastening to the vehicle body and forms an underbody protection.

According to certain preferred embodiments of the invention, this aspect is achieved in that the body element can be exchangeably connected with a strip support profile by way of mutually corresponding longitudinal profile edges on the body element and the support profile, said profile edges being constructed with respective concave and convex cross-sections, wherein the support profile is connectable, on one side, by way of fastening consoles spaced on the vehicle body and, on another side, by way of the fastening elements on the support profile with the vehicle body. Additional advantageous characteristics are contained in other preferred embodiments.

Principal advantages achieved by way of certain preferred embodiments of the invention are that optionally a running board or a side member covering can be mounted on the vehicle in a simple manner, and an optimal stepping stability is ensured when a running board is used, and the running board and the side member covering and a connected support profile simultaneously ensure a protection of the underbody structure as well as of assemblies.

For this purpose, the body elements have longitudinal profile edges which correspond with a strip-type support profile, have concavely and convexly constructed cross-sections and can be connected with one another. On the one side, the support profile can be fixedly connected with the vehicle structure by way of fastening consoles spaced on the vehicle body and, on the other side, can be fixedly connected with the vehicle body by way of fastening elements on the support profile.

To ensure that the stability of the running board is sufficient and so that the running board can be easily assembled or connected with the support profile, the running board consists of a hollow profile with a horizontally aligned stepping surface which is adjoined by an interior rounded and an exterior, approximately linear wall. These two walls are adjoined on the end side by the longitudinal profile edge of the externally mounted element which has a concave cross-section and reaches on both sides over the longitudinal profile edge of the support profile which has a convex cross-section.

For the engaging connection, the concave longitudinal profile edge of the externally mounted element has a bent leg, which is situated on top and in an engaging manner reaches over a profile edge of the convex longitudinal edge of the support profile, and an adjoining wall of the externally mounted element, which is situated on the bottom, is rounded and rests against a corresponding wall of the longitudinal profile edge of the support profile. As a result, by a swivelling with respect to the support profile, the running board or the side member covering can be hung into the longitudinal profile edge or can be lifted out of it.

The form-locking connection of the longitudinal profile edges can be fastened between the externally mounted element and the support profile by way of screws or rivets.

The direct connection of the support profile with the vehicle body takes place by way of fastening consoles which are mounted on the forward, rearward and central area of the vehicle body and which are connected with the vehicle body, the support profile being fastenable to the vehicle body by way of additional fastening webs. The fastening consoles have screw-down surfaces for the support profile which are aligned approximately in a horizontal plane, the bores for the fastening screws being arranged approximately in a central perpendicular longitudinal plane of the support profile.

As a result of the connection of the support profile by way of the consoles fastened to the vehicle body as well as additionally by way of the fastening elements, a stable detachable linking to the vehicle body is established so that the support profile can accommodate a loadable running board.

For covering a space between the frame side rail and the side member of the vehicle, the support profile can have a covering metal sheet which also accommodates the forward fastening console.

For reducing noise, foam material inserts can be provided between the externally mounted element and the support profile.

For sealing the open ends of the running board or of the side member covering and of the support profile, end caps are provided which, by way of a sealing element, are connected in a tightly sealing manner with the externally mounted element and the support profile respectively.

Other objects, advantages and novel features of the present invention will become apparent from the following detailed description of the invention when considered in conjunction with the accompanying drawings.

BRIEF DESCRIPTION OF THE DRAWINGS

FIG. 4a shows a diagrammatic representation of the support profile with the fastening consoles and the fastening elements;

DETAILED DESCRIPTION OF THE DRAWINGS

Figure 1:
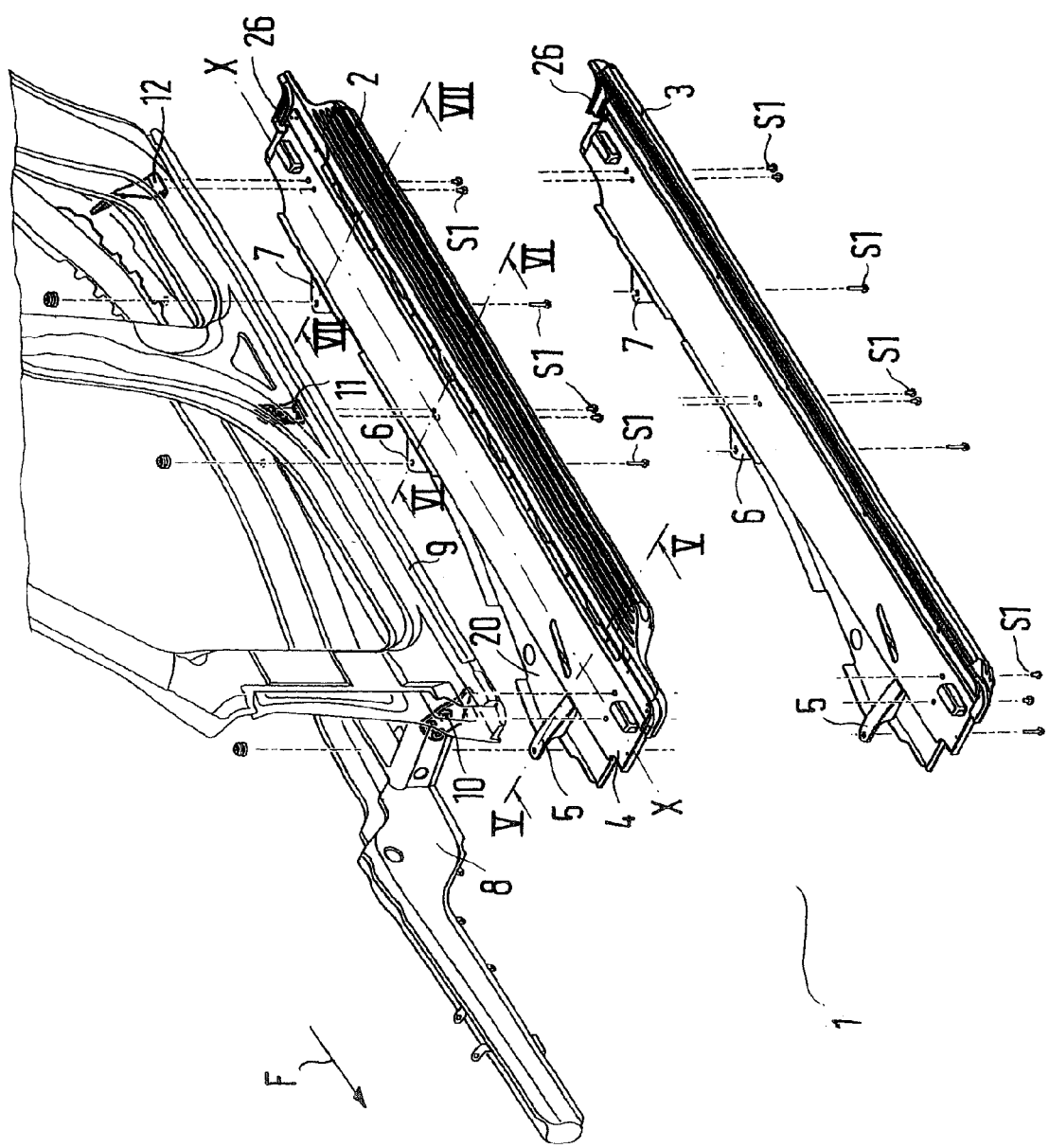
FIG. 1 shows a diagrammatic representation of the arrangement with a side wall of the vehicle and an externally mountable running board or an externally mountable side member covering on a support profile.

The arrangement 1, as shown in FIG. 1, for fastening externally mounted elements, such as a running board 2 or a side member covering 3, to the vehicle comprises a support profile 4 which is connected by way of fastening elements or fastening brackets or similar devices 5, 6, and 7 with the vehicle body on the frame side rail 8 and/or on the side member 9. Additionally, a fastening on consoles 10, 11 and 12 takes place. Optionally, as seen in FIGS. 5–8, the running board 2 or the side member covering 3 can be connected by way of a hung-in or hooked connection 13 between longitudinal profile edges P1 and P2 of the support profile 4 and of the running board 2 and of the side member cover 3 with this vehicle-fixed support profile 4.

Figure 2:
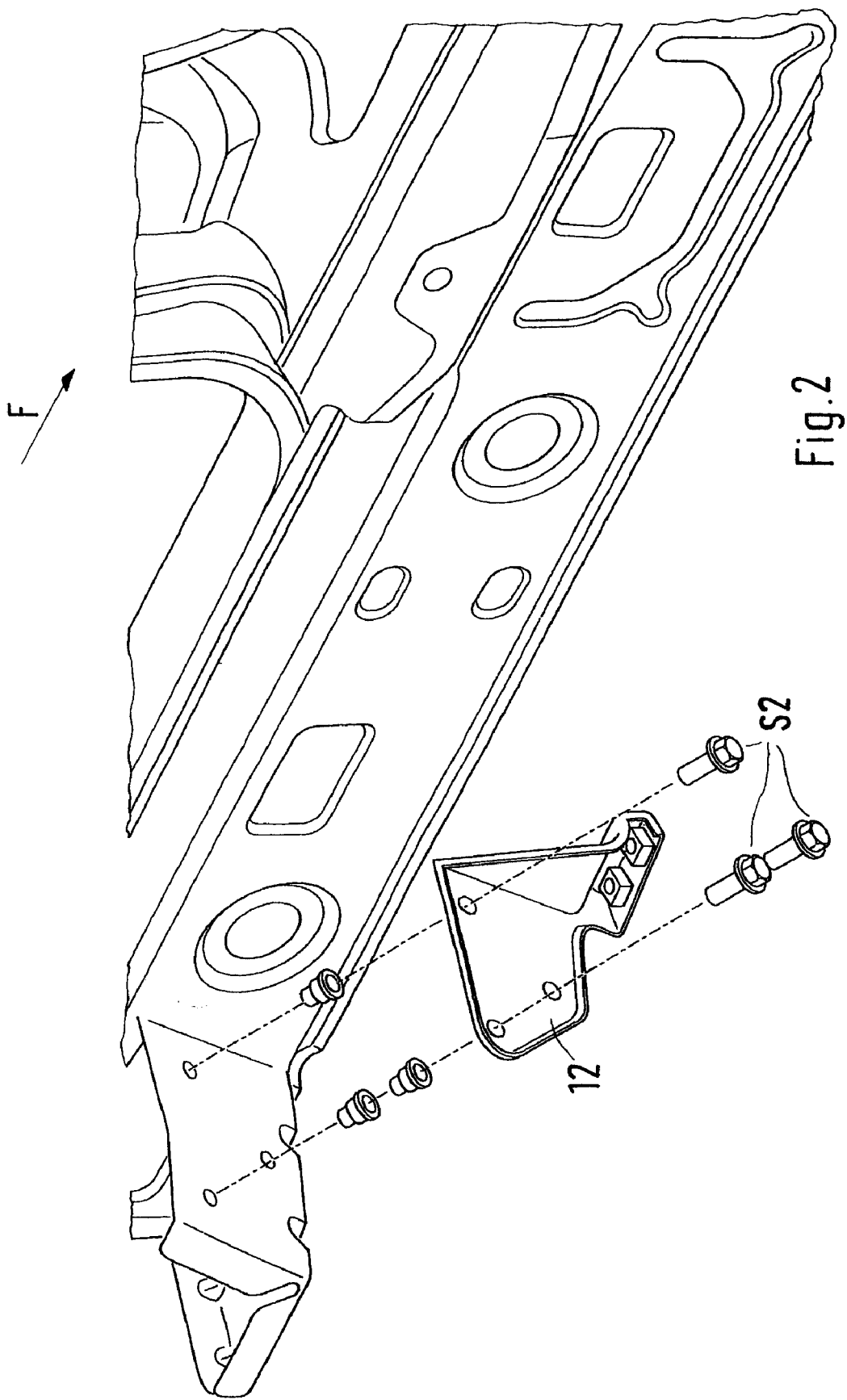
FIG. 2 shows a view of a rearward fastening console for the support profile.
Figure 3:
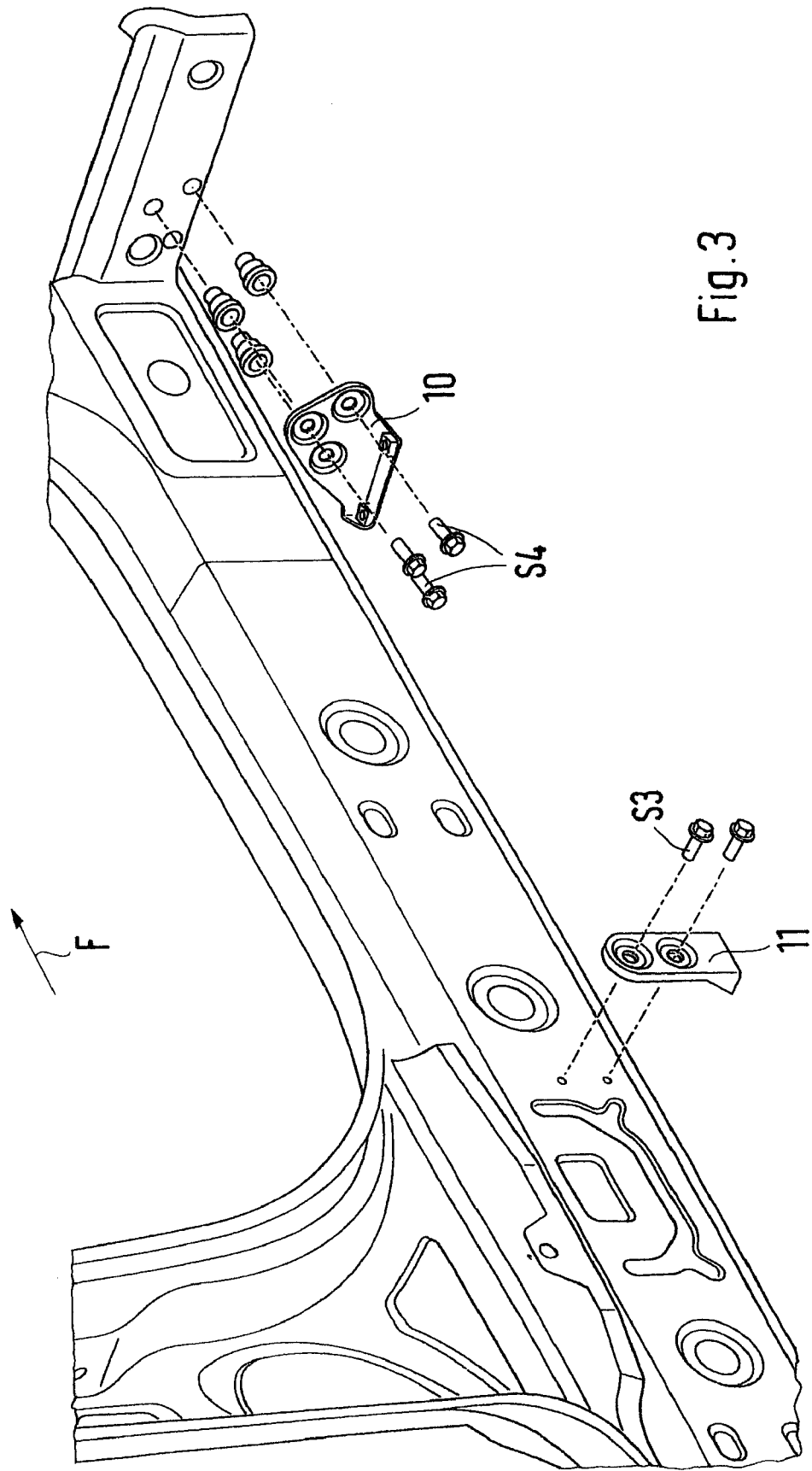
FIG. 3 shows a view of a forward and a central fastening console for the support profile.

The fastening consoles 10, 11 and 12, as shown in FIGS. 2 and 3, are fastened to the vehicle body by way of screws S2, S3, S4, and these consoles have joint horizontal screw-down surfaces for the support profile 4. For this purpose, the screws S2, S3 and S4 are guided through approximately in the center of the support profile 4 in a perpendicular longitudinal plane X—X and can be fastened in the fastening consoles 10, 11 and 12, for example, in nuts.

The further connection of the support profile 4 with the vehicle body takes place by way of elements fixedly connected with the support profile 4, such as brackets 5, 6 and 7. The latter are connected with the frame side rail or the side member 9 by way of screws S1.

On the forward side, the support profile 4 is equipped with a so-called covering metal sheet 20 which has the purpose of covering a space between the frame side rail 8 and the side member 9.

The longitudinal profile edge P1 of the running board 2 or of the side member covering 3 has a concavely profiled cross-section and the additional longitudinal profile edge P2 of the support profile 4 corresponding with this longitudinal profile edge P1 has a convex cross-section, and the two longitudinal profile edges P1 and P2 form the form-locking hung-in or hooked connection 13 between the support profile 4, on the one hand, and the running board 2 or the side member covering 3, on the other hand.

Figure 5:
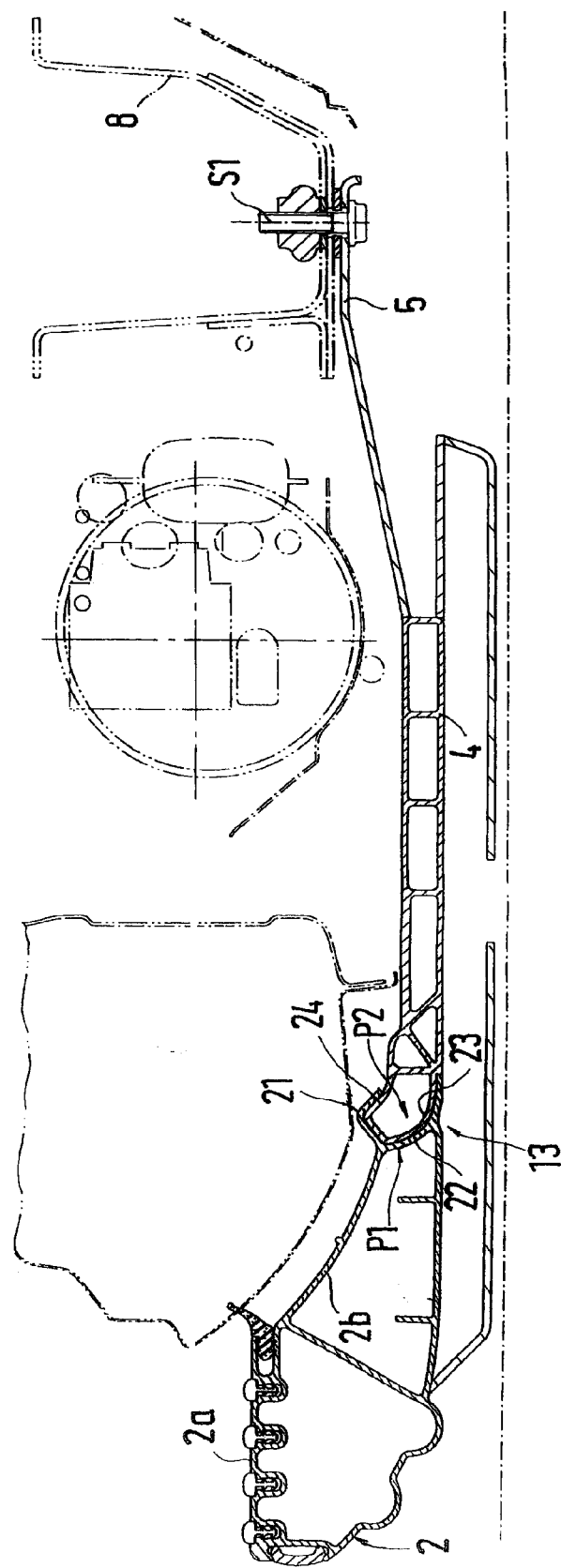
FIG. 5 shows a cross-sectional view of the running board with the support profile and the forward fastening elements according to Line V—V of FIG. 1.
Figure 6:
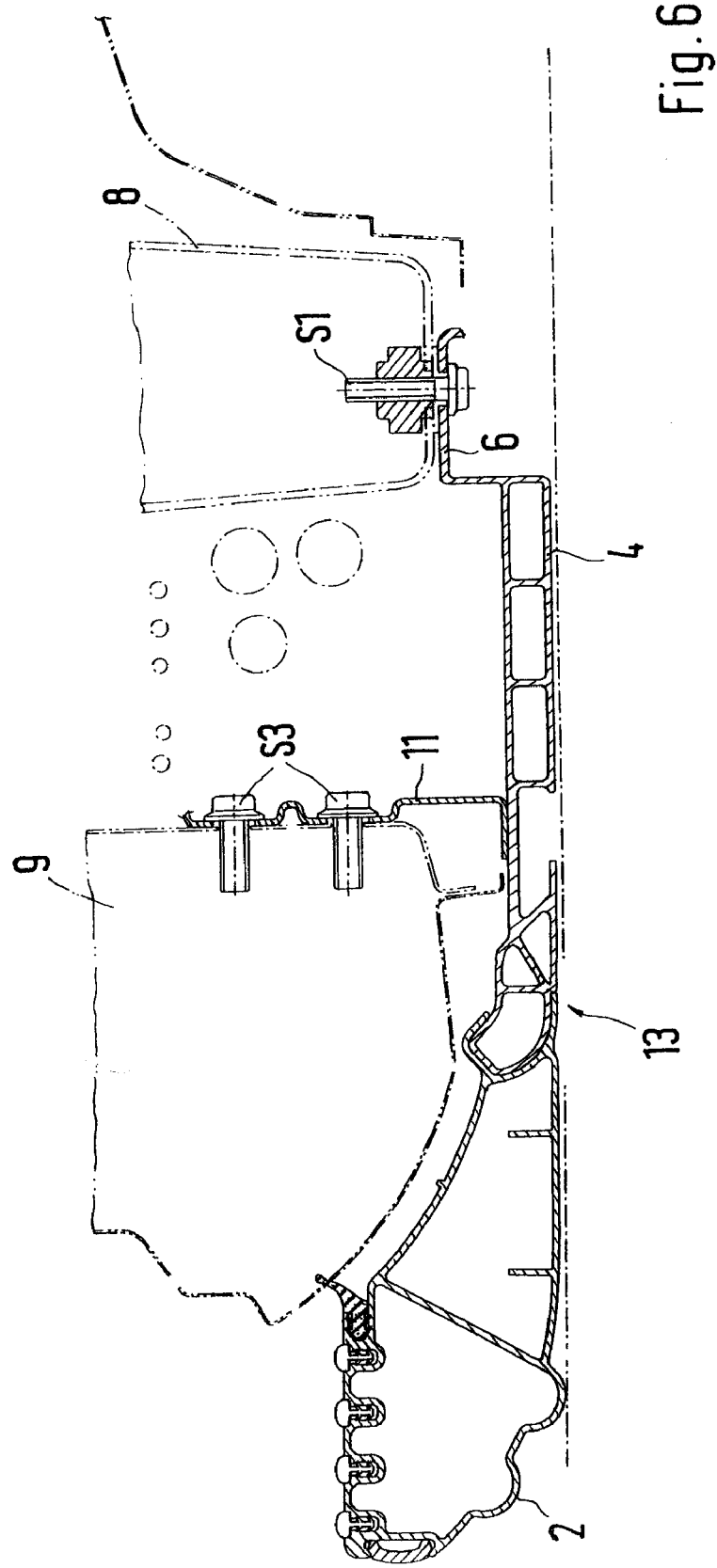
FIG. 6 shows a cross-sectional view of the running board with the support profile and the central fastening web according to Line VI—VI of FIG. 1.
Figure 7:
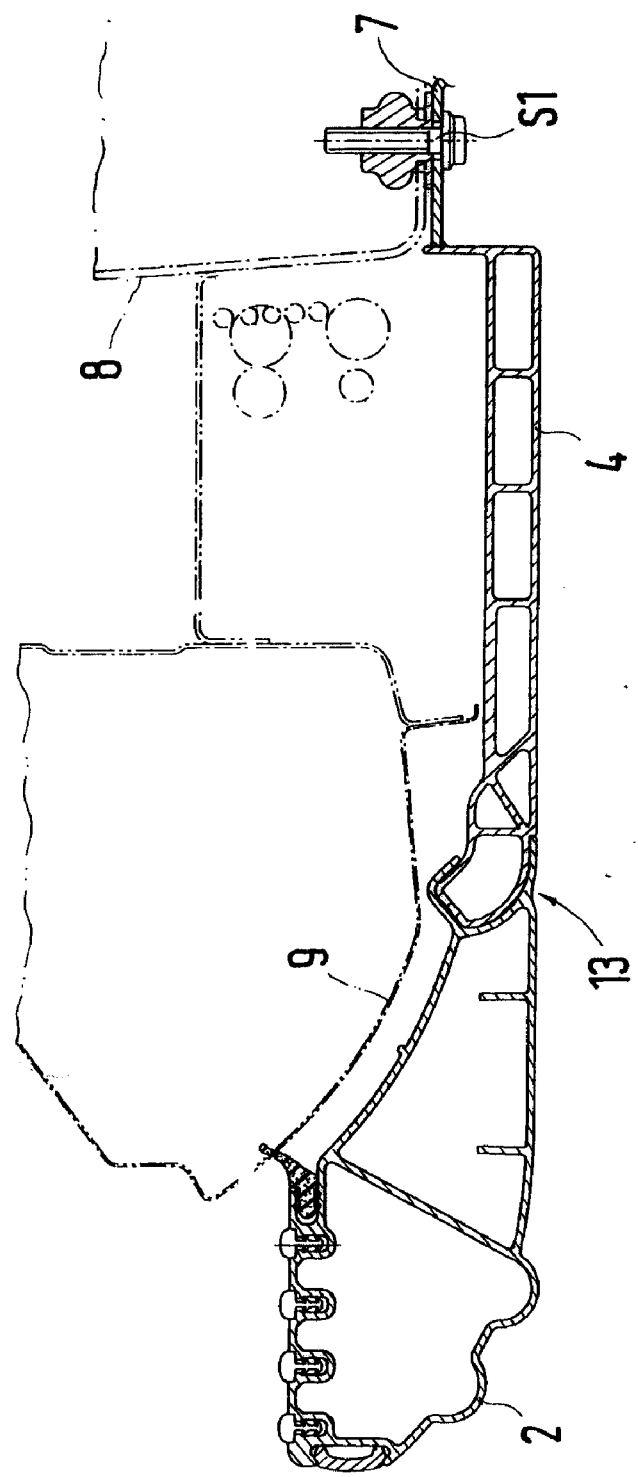
FIG. 7 shows a cross-sectional view of the running board with the support profile and the rearward fastening element according to Line VII—VII of FIG. 1.
Figure 8:
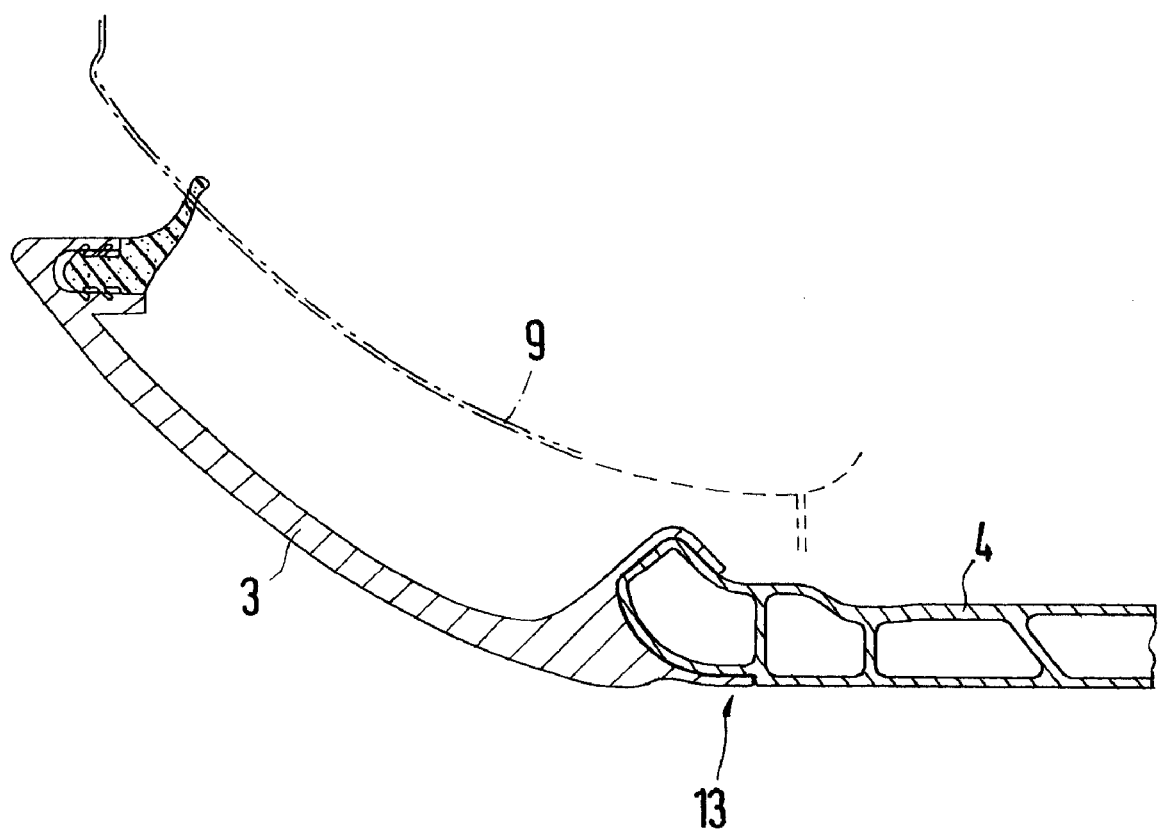
FIG. 8 shows a cross-sectional view of a side member covering with the support profile.

The longitudinal profile edge P1 of the support profile 4 comprises a bent leg 21 which is situated on top and adjoins an interior rounded wall 2b of the running board 2a, in FIG. 5, a downward-pointing rounded wall 22 adjoining the rounded wall 2b. Together with the leg 21, the downward pointing rounded wall 22 forms the concave receiving device of the longitudinal profile edge P1.

The additional longitudinal profile edge P2 of the externally mounted element 2, 3 is arranged to correspond with this longitudinal profile edge P1 of the of the support profile P1. This additional longitudinal profile edge P2 has a convex wall 23 which is situated opposite the wall 22 and which is adjoined by a form-locking wall 24 situated in the leg 21. This longitudinal profile edge P1 of the externally mounted element 2, 3, which has a concave cross-section, forms the connection 13 together with the convex longitudinal profile edge P2. By way of rivets or screws, these longitudinal profile edges P1 and P2 can be fixedly but detachably connected with one another.

Noise-reducing or vibration-damping plastic pads 40, which may be mutually spaced, are arranged between the running board 2 and the side member covering 3.

Figure 4:
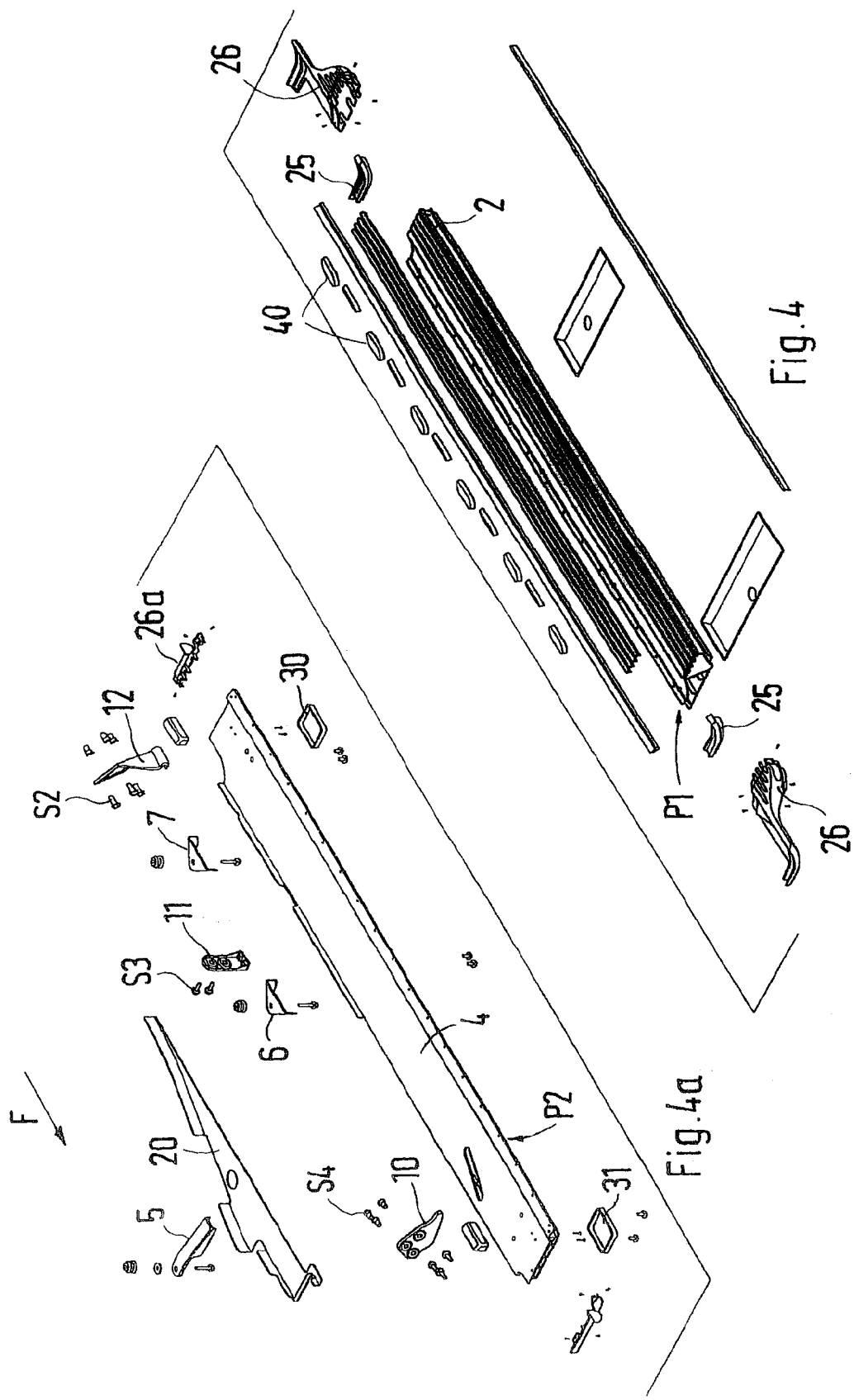
FIG. 4 shows a diagrammatic representation of a running board with end pieces and foam rubber pads.

For the end-side sealing-off of the running board 2 of the side member covering 3 as well as of the support profile 4, a sealing element 25 is provided, as shown in FIG. 4, on which adjoining end caps 26, 26a are arranged.

In the support profile 4, a receiving device for a jack is integrated, which receiving device can be of an inserted reinforcement 30, 31 and which can be arranged on the forward side and the rearward side of the support profile 4, which is illustrated in detail in FIG. 4a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for fastening an externally mounted body element to a body structure of a motor vehicle by way of fastening elements, the body element extending along a side of the vehicle body, wherein the body element can be exchangeably connected with a strip support profile by way of mutually corresponding longitudinal profile edges on the body element and the support profile, said profile edges being constructed with respective concave and convex cross-sections, and wherein the support profile is connectable, on one side, by way of fastening consoles spaced on the vehicle body and, on another side, by way of the fastening elements on the support profile with the vehicle body.

2. An arrangement according to claim 1, wherein the externally mounted body element is closed off at a free end by way of an end cap and, wherein a sealing element is provided between the end cap and the free end of the externally mounted body element.

3. An arrangement according to claim 1, wherein the body element is a running board or a side member covering.

4. An arrangement according to claim 1, wherein the spaced foam pads are arranged between the body element and a side member or frame side rail of the vehicle body.

5. An arrangement according to claim 1, wherein the externally mounted body element and the support profile between the longitudinal profile edges are connected with one another by way of screws or rivets.

6. An arrangement according to claim 5, wherein the support profile is fastened by way of the fastening consoles, which are connected by way of screws to a forward, rearward and central area of the vehicle body, to the vehicle body by way of fastening screws, and the support profile can additionally be fastened to the vehicle body by way of the fastening elements.

7. An arrangement according to claim 1, wherein spaced foam pads are arranged between the externally mounted body element and the vehicle body.

8. An arrangement according to claim 7, wherein the externally mounted body element is closed off at a free end by way of an end cap and, wherein a sealing element is provided between the end cap and the free end of the externally mounted body element.

9. An arrangement according to claim 1,
wherein the longitudinal profile edge of the externally mounted body element being concave comprises a bent leg situated on top which, in a hooking manner, reaches over a profile edge of the longitudinal profile edge of the support profile which is convex, and
wherein an adjoining wall of the externally mounted body element, which is situated below, is rounded and rests against a corresponding wall of the longitudinal profile edge of the support profile.

10. An arrangement according to claim 9, wherein spaced foam pads are arranged between the externally mounted body element and the vehicle body.

11. An arrangement according to claim 8,
wherein the externally mounted body element is closed off at a free end by way of an end cap and,
wherein a sealing element is provided between the end cap and the free end of the externally mounted body element.

12. An arrangement according to claim 9, wherein the support profile is fastened by way of the fastening consoles, which are connected by way of screws to a forward, rearward and central area of the vehicle body, to the vehicle body by way of fastening screws, and the support profile can additionally be fastened to the vehicle body by way of the fastening elements.

13. An arrangement according to claim 12, wherein a connection metal sheet is connected with the support profile, the forward fastening console being integrated into said connection metal sheet.

14. An arrangement according to claim 1, wherein a running board as the body element comprises at least one hollow profile with a horizontally aligned running surface which is adjoined by an interior rounded wall and an exterior, approximately linear wall, and said walls are adjoined on an end side by the longitudinal profile edge of the externally mounted body element which has a concave cross-section and which reaches on both sides over the longitudinal profile edge of the support profile, said longitudinal profile edge of the support profile having a convex cross-section.

15. An arrangement according to claim 14,
wherein the longitudinal profile edge of the externally mounted body element being concave comprises a bent leg situated on top which, in a hooking manner, reaches over a profile edge of the longitudinal profile edge of the support profile which is convex, and
wherein an adjoining wall of the externally mounted body element, which is situated below, is rounded and rests against a corresponding wall of the longitudinal profile edge of the support profile.

16. An arrangement according to claim 14, wherein the externally mounted body element with the support profile between the longitudinal profile edges are connected with one another by way of screws or rivets.

17. An arrangement according to claim 14, wherein spaced foam pads are arranged between the externally mounted body element and the vehicle body.

18. An arrangement according to claim 14,
wherein the externally mounted body element is closed off at a free end by way of an end cap and,
wherein a sealing element is provided between the end cap and the free end of the externally mounted body element.

19. An arrangement according to claim 14, wherein the support profile is fastened by way of the fastening consoles, which are connected by way of screws to a forward, rearward and central area of the vehicle body, to the vehicle body by way of fastening screws, and the support profile can additionally be fastened to the vehicle body by way of the fastening elements.

20. An arrangement according to claim 19, wherein the fastening consoles have screw-down surfaces for the support profile approximately aligned in a horizontal plane, bores for the fastening screws being arranged approximately in a central perpendicular longitudinal plane of the support profile.

21. An arrangement according to claim 1, wherein the support profile is fastened by way of the fastening consoles, which are connected by way of screws to a forward, rearward and central area of the vehicle body, to the vehicle body by way of fastening screws, and the support profile can additionally be fastened to the vehicle body by way of the fastening elements.

22. An arrangement according to claim 21, wherein spaced foam pads are arranged between the externally mounted body element and the vehicle body.

23. An arrangement according to claim 21,
wherein the externally mounted body element is closed off at a free end by way of an end cap and,
wherein a sealing element is provided between the end cap and the free end of the externally mounted body element.

24. An arrangement according to claim 21, wherein the fastening consoles have screw-down surfaces for the support profile approximately aligned in a horizontal plane, bores for the fastening screws being arranged approximately in a central perpendicular longitudinal plane of the support profile.

25. An arrangement according to claim 24, wherein a connection metal sheet is connected with the support profile, the forward fastening console being integrated into said connection metal sheet.

26. An arrangement according to claim 21, wherein a connection metal sheet is connected with the support profile, the forward fastening console being integrated into said connection metal sheet.

27. An arrangement according to claim 26, wherein spaced foam pads are arranged between the externally mounted body element and the vehicle body.

28. An arrangement according to claim 26,
wherein the externally mounted body element is closed off at a free end by way of an end cap and,
wherein a sealing element is provided between the end cap and the free end of the externally mounted body element.

29. A body structure assembly of motor vehicle body, comprising:
an externally mounted body element extending along a side member of the vehicle body,
fastening elements for fastening the body element to a body structure of the vehicle body, and
a strip support profile removably connectable to the body element by mutually corresponding longitudinal profile edges on the body element and the support profile, the profile edges being constructed with respective concave and convex cross-sections,
wherein the support profile is connectable to the vehicle body by fastening consoles spaced on the vehicle body and the fastening elements of the support profile.

30. A body structure assembly according to claim 29, wherein the body element is a running board or a side member covering.

31. A method of making an assembly for fastening an externally mounted body element to a body of a vehicle by fastening elements, comprising:

providing a strip support profile, connecting the support profile to the vehicle body, on one side, by fastening consoles spaced on the vehicle body and, on another side, by the fastening elements on the support profile, and exchangeably connecting a body element, which operatively extends along a side of the vehicle body, to the support profile via mutually corresponding longitudinal profile edges on the body element and the support profile, wherein the profile edges are constructed with a respective concave and convex cross-section.

32. A method according to claim 31, wherein the body element is a running board or a side member covering.

33. A method according to claim 31, wherein a running board as the body element comprises at least one hollow profile with a horizontally aligned running surface which is adjoined by an interior rounded wall and an exterior, approximately linear wall, and said walls are adjoined on an end side by the longitudinal profile edge of the externally mounted body element which has a concave cross-section and which reaches on both sides over the longitudinal profile edge of the support profile, said longitudinal profile edge having a convex cross-section.

34. A method according to claim 31, wherein the longitudinal profile edge of the externally mounted body element being concave comprises a bent leg situated on top which, in a hooking manner, reaches over a profile edge of the longitudinal profile edge of the support profile which is convex, and wherein an adjoining wall of the externally mounted body element, which is situated below, is rounded and rests against a corresponding wall of the longitudinal profile edge of the support profile.

* * * * *